(12) United States Patent
Linnartz

(10) Patent No.: US 6,947,573 B2
(45) Date of Patent: **\*Sep. 20, 2005**

(54) WATERMARKING AN INFORMATION SIGNAL

(75) Inventor: Johan P. M. G. Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/738,554

(22) Filed: Dec. 17, 2003

(65) Prior Publication Data

US 2004/0131228 A1 Jul. 8, 2004

Related U.S. Application Data

(63) Continuation of application No. 10/418,585, filed on Apr. 18, 2003, now Pat. No. 6,714,659, which is a continuation of application No. 09/146,022, filed on Sep. 2, 1998, now Pat. No. 6,570,996.

(30) Foreign Application Priority Data

Sep. 2, 1997 (EP) .......................................... 97202700

(51) Int. Cl.$^7$ ................................................ G06K 9/00
(52) U.S. Cl. ....................................... 382/100; 725/20
(58) Field of Search ............................... 382/100, 232; 348/460, 461, 462, 463; 386/94; 725/9, 20, 22; 380/51, 54, 210, 252, 287; 713/176; 370/522, 527, 529

(56) References Cited

U.S. PATENT DOCUMENTS

| | | | | |
|---|---|---|---|---|
| 5,915,027 A | * | 6/1999 | Cox et al. ...................... | 380/54 |
| 5,960,081 A | * | 9/1999 | Vynne et al. .................. | 380/10 |
| 6,064,764 A | * | 5/2000 | Bhaskaran et al. ......... | 382/183 |
| 6,570,996 B1 | * | 5/2003 | Linnartz ...................... | 382/100 |
| 6,690,812 B2 | * | 2/2004 | Reefman et al. ............ | 382/100 |
| 2002/0080995 A1 | * | 6/2002 | Rhoads ....................... | 382/100 |
| 2002/0080996 A1 | * | 6/2002 | Rhoads ....................... | 382/100 |
| 2003/0128861 A1 | * | 7/2003 | Rhoads ....................... | 382/100 |

FOREIGN PATENT DOCUMENTS

| | | | |
|---|---|---|---|
| EP | 0 372 601 | * | 6/1990 |
| EP | 0 565 947 | * | 10/1993 |
| WO | WO 97/13248 | * | 9/1996 |
| WO | WO 98/33324 | * | 1/1998 |
| WO | WO 99/12331 | * | 8/1998 |

OTHER PUBLICATIONS

Wenjun Zeng and Bede Liu; "On Resolving Rightful Ownerships of Gigital Images by Invisible Watermarks"; IEEE Image Processing; International Conference Proceedings; vol. 1, 1997; pp. 552–555, Jul. 1997.*

Fu, M et al., "A Multi–bit Robust watermarl for Halftone Images", IEEE, PP 213–216, 2003.*

Chandramouli, R et al., "Analysis of LSB based IMage Steganography Techniques", IEEE, pp 1019–1022, 2001.*

Tefas, A et al., "Multi–bit watermarking Robust to Geometric Distributions", IEEE, pp710–713, 2000.*

Yeh, C et al., "Digital watermarking through Quasi m–arrays", IEE, pp456–461, 1999.*

Xie, L et al., "Joint Wavelet Compression and Authentication Watermarking", IEEE, pp427–431, 1998.*

* cited by examiner

Primary Examiner—Samir Ahmed

(57) ABSTRACT

A method and an arrangement for detecting a multi-bit watermark in a signal (e.g. a video image) are disclosed. Each bit of the multi-bit value is represented by an embedded watermark subpattern in the signal. Instead of detecting in a conventional manner the presence of each individual subpattern (i.e. detecting each individual bit), the detection comprises the steps of: detecting (24,23) the presence of the full watermark in the signal irrespective of its multi-bit value, and detecting (25) to which extent the presence of subpatterns corresponds with the multi-bit value to be checked. The reliability of watermark detection is hereby improved.

4 Claims, 3 Drawing Sheets ly invisible messages embedded in information signals such as multimedia material, e.g. audio, still pictures, animations or video. Watermarks can be used to identify the copyright ownership of information. They allow a copyright owner to trace illegal copies of his material by inspecting whether his watermark is present in said copies.

WATERMARKING AN INFORMATION SIGNAL

CROSS REFERENCE TO RELATED APPLICATION

This is a continuation of prior application Ser. No. 10/418,585 filed Apr. 18, 2003 now U.S. Pat. No. 6,714,659 which is a continuation of application Ser. No. 09/146,022 filed Sep. 2, 1998 now U.S. Pat. No. 6,570,996.

FIELD OF THE INVENTION

The invention relates to the field of watermarking an information signal and detecting a watermark.

BACKGROUND OF THE INVENTION

Watermarks are perceptually invisible messages embedded in information signals such as multimedia material, e.g. audio, still pictures, animations or video. Watermarks can be used to identify the copyright ownership of information. They allow a copyright owner to trace illegal copies of his material by inspecting whether his watermark is present in said copies.

Watermarks are embedded in an information signal by modifying data samples of the signal (e.g. audio samples of an audio signal, pixels of an image, transform coefficients of a transform-coded signal, etc.) such that the original is not perceptibly affected. Various methods of watermarking are known in the art. For example, pixels of an original image are slightly incremented or decremented in accordance with corresponding bits of a binary watermark pattern.

In order to detect whether an information signal has an embedded watermark, the signal is subjected to a statistical analysis. The statistical analysis yields a parameter, hereinafter referred to as "decision variable", which indicates to which extent the watermark is present in the signal. For example, if an image signal is watermarked by incrementing or decrementing its pixels in accordance with a watermark pattern, the decision variable may be the amount of correlation between the signal and an applied reference copy of the watermark. If an image is watermarked by modifying selected pixels, a prediction for said pixels is calculated from temporally or spatially adjacent pixels. The decision variable may then be the number of pixels being sufficiently different from their prediction.

Watermark detectors generate a binary output signal indicating "watermark found" or "no watermark found". That is achieved by comparing the decision variable with a predetermined threshold. If the value of the decision variable exceeds the threshold, the watermark is considered to be present in the signal.

OBJECT AND SUMMARY OF THE INVENTION

It is an object of the invention to provide a method and arrangement for detecting the presence of a multi-bit watermark value in the signal. It is also an object of the invention to provide a method and arrangement for accommodating such a multi-bit watermark value in images of a video signal.

This is achieved in by a method of detecting a multi-bit watermark in a signal, each bit of said multi-bit watermark being represented by a respective watermark subpattern, comprising the steps of: determining, for each watermark subpattern, a correlation value indicating the extent to which said subpattern is present in the signal; combining said correlation values to detect whether the watermark is present in the signal irrespective of its multi-bit value; and comparing said correlation values and the corresponding bits of an applied multi-bit value to obtain an indication of to which extent the detected watermark has said applied multi-bit value.

The invention is based on the desire to embed a multi-bit watermark in a signal. This is achieved by representing each bit of the watermark by a respective watermark subpattern. A straightforward method of detecting the watermark would include using a conventional watermark detector for each individual bit of the watermark by detecting the presence of the corresponding subpattern. However, as already mentioned above, detecting a watermark is a statistical analysis process which may result in false decisions. The reliability of each individual detection is weak because its signal strength is 1/nth (n is the number of bits) of the energy in the full watermark.

The inventors have recognized that is advantageous to detect the presence of the watermark irrespective of its multi-bit value at maximum reliability, and compare the (Hamming) distance between the intermediate results (i.e. the extents to which individual subpatterns are present in the signal) and the multi-bit value which is to be checked. The reliability of the multi-bit detection is now comparable to the reliability of the detection of an entire, full strength watermark.

The invention further provides a method of embedding a multi-bit watermark in a video image by adding a watermark pattern to said image, comprising the steps of: dividing the video image and said watermark pattern into blocks, the blocks of the watermark pattern constituting subpatterns; and representing each bit of the multi-bit value by adding or not adding a subpattern to the corresponding image block.

DESCRIPTION OF A PREFERRED EMBODIMENT

The invention will now be described with reference to a watermark detector in which the decision variable indicating to which extent the watermark is present in the signal is the amount of correlation between the signal being analysed and a reference copy of the watermark to be detected. However, the description should not be interpreted as restricting the invention to such an embodiment.

Figure 1:
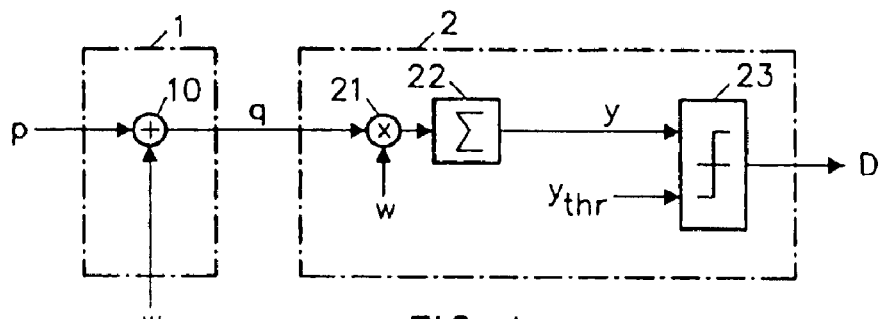
FIG. 1 shows a prior art system comprising a watermark embedder and a watermark detector.
Figure 2:
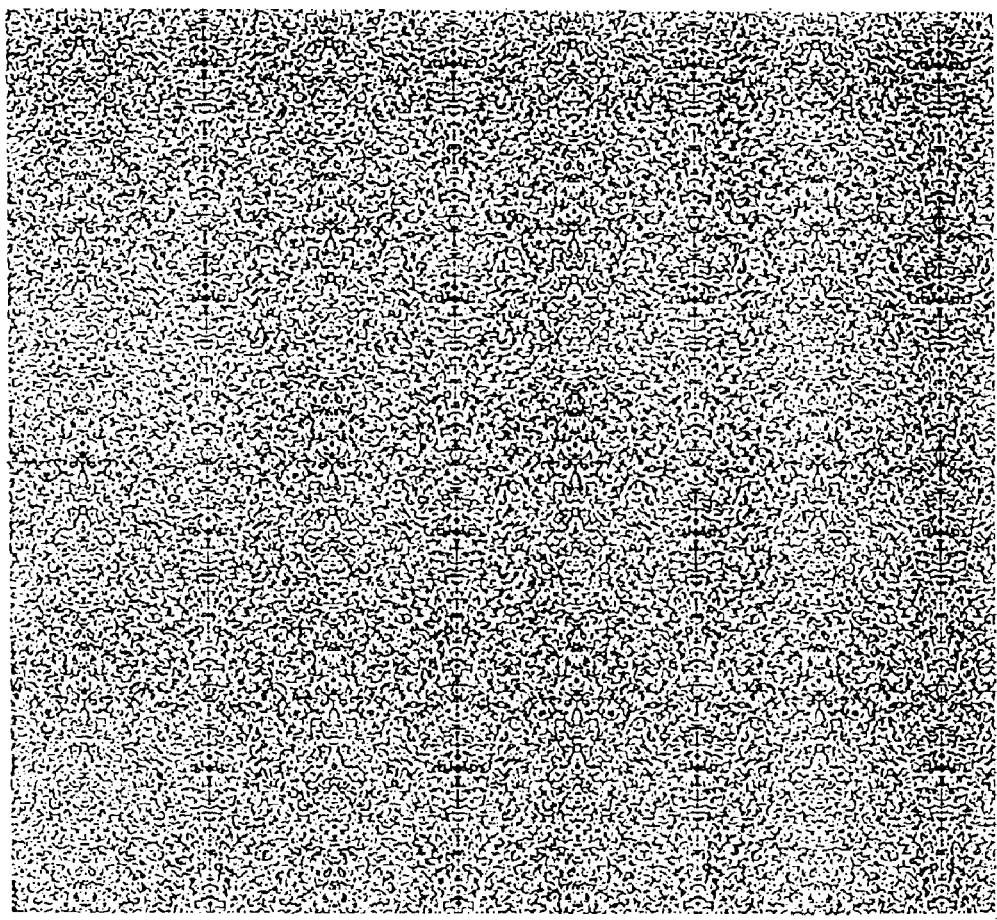
FIG. 2 shows a watermark pattern to illustrate the operation of the system which is shown in FIG. 1.

FIG. 1 shows a prior art watermark detector comprising a watermark embedder 1 and a watermark detector 2. The watermark embedder receives an original information signal p and a watermark signal w. The information signal p is assumed to be a digitized image having 8-bit luminance pixel values p(i). The watermark w is assumed to be a specific binary pattern of values w(i)=1 or w(i)=−1. An example of such a watermark pattern is shown in FIG. 2 in which white and black dots represent the values w(i)=−1 and w(i)=1, respectively. The watermark embedder comprises an adding stage 10 which adds the watermark values w(i) to the spatially corresponding pixels p(i) of the input image. It will be appreciated that this does not affect the visual appearance of the image. The embedded watermark is thus perceptually invisible.

The information signal q is applied, after transmission or storage (not shown), to the watermark detector 2. The watermark detector comprises a multiplication stage 21 and a summing circuit 22 which collectively constitute a correlation circuit. The multiplication stage receives the information signal q and a reference copy of the watermark w the presence of which in the signal q is to be detected. The pixel values q(i) of the received image and the corresponding values w(i) of the reference watermark are individually multiplied and than summed up to obtain a decision variable y which represents the amount of correlation between input signal q and watermark w. In mathematical notation:

$$y = \sum_{i=1}^{I} w(i) \times q(i)$$

in which I is the total number of pixels.

The correlation value y is applied to a comparator 23 for comparison with a threshold value $y_{thr}$. The comparator produces an output D=1 (watermark found) for $y > y_{thr}$ and an output D=0 (no watermark found) for $y < y_{thr}$. The watermark pattern w and the threshold value $y_{thr}$ are carefully chosen to avoid that the detector makes too often a false decision.

Figure 3:
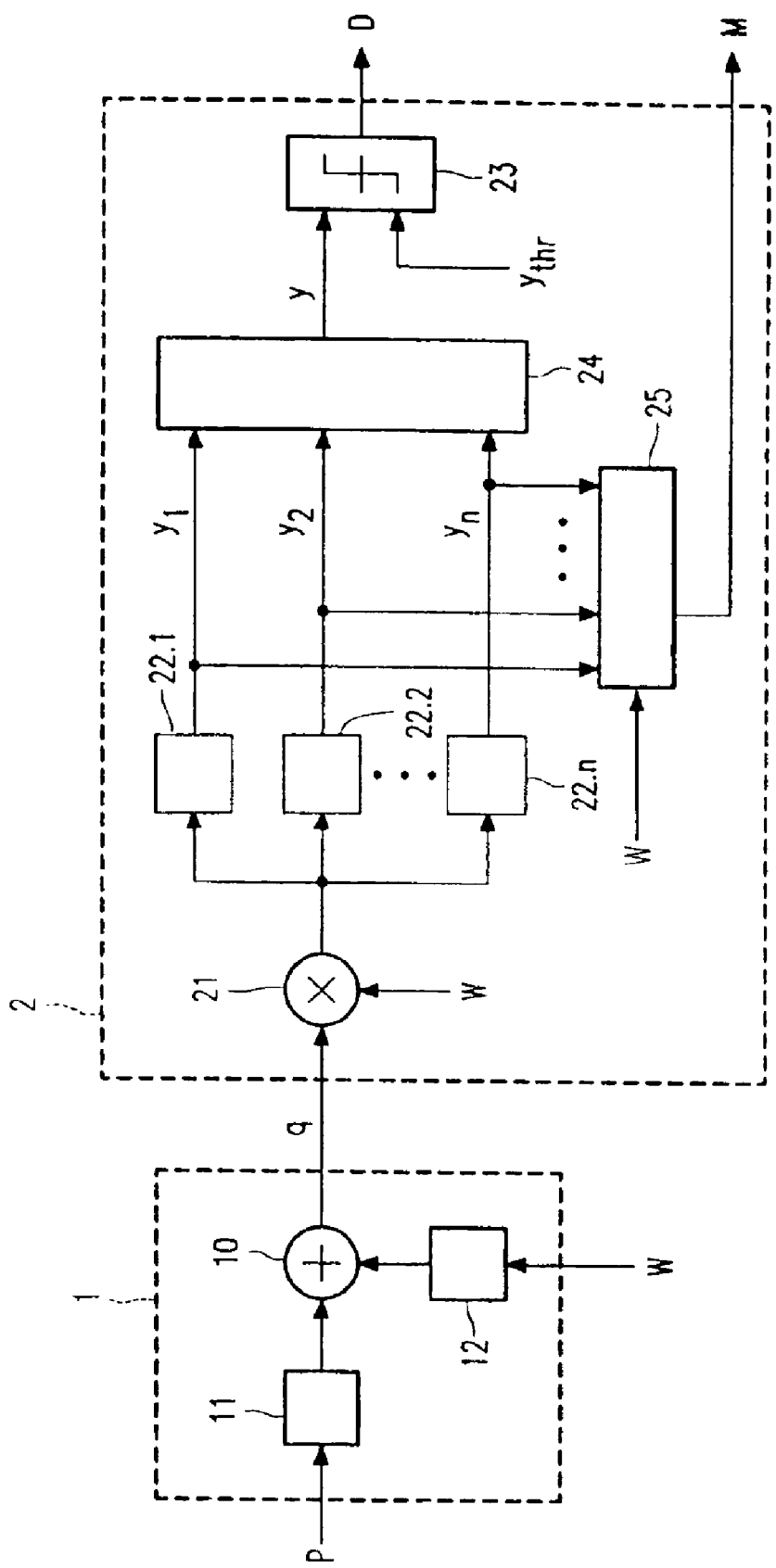
FIG. 3 shows a system comprising a watermark embedder and detector in accordance with the invention.
Figure 4:
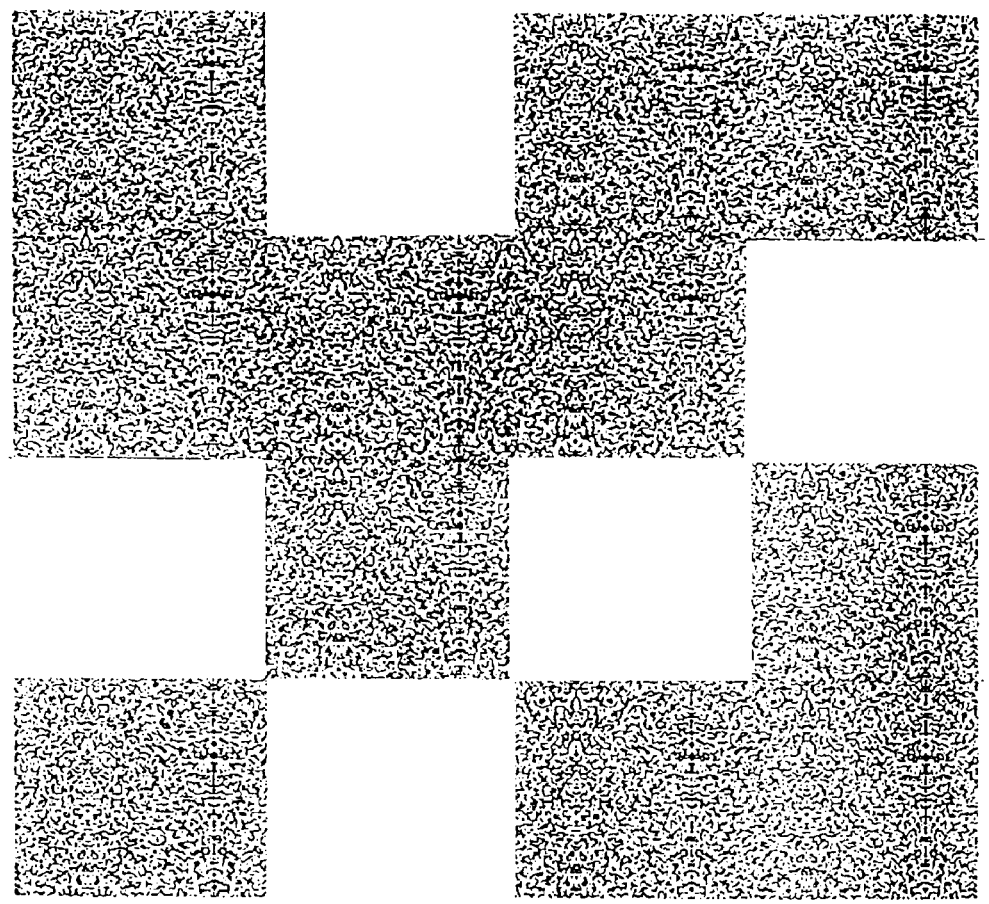
FIG. 4 shows a watermark pattern to illustrate the operation of the system which is shown in FIG. 3.

FIG. 3 shows a system comprising a watermark embedder and detector in accordance with the invention. The same reference numerals are used for circuit elements which are correspond with elements which are already been shown in FIG. 1. In this example, the applied watermark w is assumed to be a 16-bit value. Accordingly, the input image is divided into 16 blocks (n=16) by block-division means 11. By further block-division means 12, the watermark pattern w is divided into 16 subpatterns. A multi-bit value $w_1-w_n$ controls whether or not a subpattern is added to the image. This is illustrated in FIG. 4 in which the blank rectangles indicate that the corresponding image blocks are not watermarked. To compensate for the reduced watermark 'energy' caused by not watermarking all image blocks, other blocks are watermarked more intensively, for example by incrementing/decrementing the respective pixels by the value 2 instead of 1 as discussed before.

The watermark detector 2 now comprises partial accumulators 22.1, 22.2 . . . 22.n, one for each bit of the watermark w. Their outputs are combined in a final adding stage 24 to obtain the decision variable y which is applied to the comparator 23. The individual outputs of the partial accumulators represent individual correlation values $y_1-y_n$. After normalization, they have a value between 0 (no correlation) and 1 (maximum amount of correlation). A subsequent evaluation circuit 25 calculates, for each correlation value, its difference with the corresponding bit of the multi-bit value to be checked and calculates the $$M = \sum_n \{w(n) - y(n)\}^2$$

sum of the squares of said differences. Thus, the evaluation circuit calculates:

For example, if the watermark to be checked is a 4-bits value 1001, and the corresponding correlation values are $y_1=0.8$, $y_2=0.3$, $y_3=0.1$ and $y_4=0.6$, the evaluation circuit calculates $$M = (0.2)^2 + (0.3)^2 + (0.1)^2 + (0.4)^2.$$

The result is an indication of to which extent the detected watermark resembles the given multi-bit value.

In summary, a method and an arrangement for detecting a multi-bit watermark in a signal (e.g. a video image) are disclosed. Each bit of the multi-bit value is represented by an embedded watermark subpattern in the signal. Instead of detecting in a conventional manner the presence of each individual subpattern (i.e. detecting each individual bit), the detection comprises the steps of: detecting (24,23) the presence of the full watermark in the signal irrespective of its multi-bit value, and detecting (25) to which extent the presence of subpatterns corresponds with the multi-bit value to be checked. The reliability of watermark detection is hereby improved.

What is claimed is:

1. A method of detecting a multi-bit watermark value in a signal, each bit of said multi-bit watermark value being represented by a respective subpattern of a watermark pattern, comprising:

determining, for each watermark subpattern, a correlation value indicating the extent to which said subpattern is present in the signal;

combining said correlation values to detect whether the watermark pattern is present in the signal irrespective of the multi-bit watermark value; and comparing said correlation values and the corresponding bits of an applied multi-bit watermark value to obtain an indication of to which extent the detected watermark pattern has said applied multi-bit watermark value.

2. A method as claimed in claim 1, wherein said step of comparing comprises calculating the sum of squares of differences between each correlation value and the corresponding bit of the applied multi-bit value.

3. A method as claimed in claim 1, wherein the signal is a video image which is watermarked by adding a watermark pattern to said image, the video image and the watermark pattern being divided into blocks, the blocks of the watermark pattern constituting said subpatterns, and wherein each bit of the multi-bit value is represented by whether or not a subpattern has been added to a corresponding image block.

4. An arrangement for detecting a multi-bit watermark value in a signal, each bit of said multi-bit watermark being represented by a respective subpattern of a watermark pattern, comprising:

means for determining, for each watermark subpattern, a correlation value indicating the extent to which said subpattern is present in the signal;

means for combining said correlation values to detect whether the watermark pattern is present in the signal irrespective of the multi-bit watermark value; and means for comparing said correlation values and the corresponding bits of the multi-bit watermark value to obtain an indication of to which extent the detected watermark pattern represents the multi-bit watermark value.

* * * * *